(12) United States Patent
Karve et al.

(10) Patent No.: US 8,005,834 B2
(45) Date of Patent: Aug. 23, 2011

(54) METHOD AND APPARATUS TO MAP ASSOCIATIONS WITH BITSETS

(75) Inventors: Alexei A. Karve, Mohegan Lake, NY (US); Thomas E. Chefalas, Somers, NY (US); Steven J. Mastrianni, Unionville, CT (US)

(73) Assignee: International Business Machines Corporation, Armonk, NY (US)

( * ) Notice: Subject to any disclaimer, the term of this patent is extended or adjusted under 35 U.S.C. 154(b) by 749 days.

(21) Appl. No.: 10/731,535

(22) Filed: Dec. 9, 2003

(65) Prior Publication Data

US 2005/0125388 A1    Jun. 9, 2005

(51) Int. Cl.
G06F 7/00   (2006.01)
G06F 17/30   (2006.01)
(52) U.S. Cl. ......... 707/736; 707/745; 707/758; 707/769
(58) Field of Classification Search .............. 707/1–10
See application file for complete search history.

(56) References Cited

U.S. PATENT DOCUMENTS

| | | | | |
|---|---|---|---|---|
| 6,460,043 | B1 * | 10/2002 | Tabbara et al. | 707/100 |
| 6,996,574 | B2 * | 2/2006 | Gluckman | 707/102 |
| 2003/0135495 | A1 * | 7/2003 | Vagnozzi | 707/3 |
| 2004/0177065 | A1 * | 9/2004 | Tropf | 707/3 |

OTHER PUBLICATIONS

Morzy, T. and Zakrzewicz, M. "Group bitmap index: A structure for association rules retrieval." KDD-98, 1998.*

* cited by examiner

*Primary Examiner* — Jay A Morrison
(74) *Attorney, Agent, or Firm* — Thomas A. Beck; Daniel P. Morris

(57) ABSTRACT

Database systems using BitSets to model and manage relationships between and/or among entities describing the corresponding fast user defined scalar and column functions used for BitSets, including a technique to model categorization and steps to perform rule evaluation from retrieving the entities associated with ancestors and descendent categories, as well as a technique to model Boolean Expression using Bitsets for relationships and the steps to perform fast Boolean evaluation.

19 Claims, 4 Drawing Sheets

201 — STUDENT ( SID, SNAME, MAJOR )
CLASS ( CID, CNAME, TIME, ROOM )

STUDENT_CLASS ( SID, CID)

OLD WAY- USE STUDENT_CLASS TO MODEL RELATIONSHIP

202 — STUDENT ( SID, SNAME, MAJOR, CIDBS)
CLASS( CID.CNAME.TIME,ROOM, SIDBS)

NEW WAY- USE BITSETS CIDBS AND SIDBS TO MODEL RELATIONSHIP

FIG.2

401 — OLD WAY

CATEGORY (CATEGORYID BIGINT)
DOCUMENT (DOCUMENTID BIGINT)
PARENT CHILD ASSOCIATIONS (CHILDID BIGINT, PARENTID BIGINT)

402 — NEW WAY

CATEGORY(CATEGORYID BIGINT, BSDOCUMENT BITSET, BSPARENT BITSET, BSCHILD BITSET)

DOCUMENT(DOCUMENTID BIGINT)

NOR RULES: INPUT ALL FALSE ⇒ OUTPUT TRUE

| INPUT TRUE EXPRESSIONS | ANDISEMPTY EVALUATES TO FALSE | RETURNS FALSE NOR RULES |
|---|---|---|
| INPUT FALSE EXPRESSIONS + OPTIONAL | ANDEQUALS EVALUATES TO TRUE | RETURNS TRUE NOR RULES |

OR RULES: INPUT ALL FALSE ⇒ OUTPUT FALSE

| INPUT TRUE EXPRESSIONS | ANDISEMPTY EVALUATES TO FALSE | RETURNS TRUE OR RULES |
|---|---|---|
| INPUT FALSE EXPRESSIONS + OPTIONAL | ANDEQUALS EVALUATES TO TRUE | RETURNS FALSE OR RULES |

NAND RULES: INPUT ALL TRUE ⇒ OUTPUT FALSE

| INPUT TRUE EXPRESSIONS + OPTIONAL | ANDEQUALS EVALUATES TO TRUE | RETURNS FALSE NAND RULES |
|---|---|---|
| INPUT FALSE RULES | ANDISEMPTY EVALUATES TO FALSE | RETURNS TRUE NAND RULES |

AND RULES: INPUT ALL TRUE ⇒ OUTPUT TRUE

| INPUT TRUE EXPRESSIONS + OPTIONAL | ANDEQUALS EVALUATES TO TRUE | RETURNS TRUE AND RULES |
|---|---|---|
| INPUT FALSE EXPRESSIONS | ANDISEMPTY EVALUATES TO FALSE | RETURN FALSE AND RULES |

METHOD AND APPARATUS TO MAP ASSOCIATIONS WITH BITSETS

BACKGROUND OF THE INVENTION

1. Field of Invention

The present invention relates to a method and apparatus to map associations within a database using BitSets.

2. Description of the Prior Art

In enterprise and other business environments, there is a need to represent associations between two or more entities. The relationships in these associations are classified in terms of degree, connectivity, cardinality, and existence. In a relational database, a data model is used to design the relational tables. A functional model is used to design the queries that will access and perform operations on the relational tables. In the context of the present invention, a relationship is an association between two or more tables. Relationships are expressed in the data values of the primary and foreign keys. A primary key is a column or columns in a table whose values uniquely identify each row in a table. A foreign key is a column or columns whose values are the same as the primary key of another table. A relationship is made between two relational tables by matching the values of the foreign key in one table with the values of the primary key in another.

Currently, in a normalized database, relationships are modeled with the use of foreign keys from two tables, which together form the key for the association table. In this existing approach, multiple rows are required to explicitly store the many sides of relationship. This situation is an unnecessary overhead that results in increased complexity for the user to manage relationships and transactions. As a result, there is no easy way of specifying the relationship multiplicity. Multiplicity indicates how many instances of one class are related to a single instance of another class at a given point in time.

The present invention utilizes a fast BITSET implementation to model multiple foreign-keys within a single column. Presently, there is no product database that currently models relationships through multi-foreignkey columns.

SUMMARY OF THE INVENTION

The present invention relates to database systems and more specifically to using BitSets to model and manage relationships between and/or among entities. Relationships between entities for example, can be considered an ordered set. As such, one can change the lineal order of an ordered set of objects to define the various relationships. Such relationships can conveniently be given a functional description using one of the "Gang of Four" identifiers: one-to-one, one-to-many, many-to-one and many-to-many. A foreign key is a table column that establishes a link from the table it resides in, to the primary key or a candidate key in another, related table. The foreign key is the anchor on the many side of a one-to-many (1:M) relationship, much as the primary or candidate key is the anchor on the one side of this relationship. When one specifies two related tables in a JOIN query, the values in the foreign key column of the many table are compared to the values in the primary key column of the one table. If the two values match, the query returns that record in the result set.

Applicants have defined a User Defined Type BITSET and fast User defined functions to manipulate Bitsets. Scalar functions BSGetLength(BITSET), BSInit( ), BSInit(BIGINT, BIGINT), BSSetBit(BitSet, BIGINT), BSClearBit(BitSet, BIGINT), BSGetBit(BIGINT), BSAnd(BitSet, BitSet), BSOr(BitSet, BitSet), BSEquals(BitSet, BitSet), BSMinus (BitSet, BitSet), BSAndEquals(BitSet, BitSet), BSAndIsEmpty(BitSet, BitSet), BSGetBitAt(BitSet, BIGINT), BSGetUpperBound(BitSet), BSGetLowerBound(BitSet) are defined. Column functions (also called set function or aggregate function) BSCAND, BSCOR are defined. TABLE functions BSGetBits is defined.

Each (1:M) relationship is represented with the use of a BITSET column on the one side of the relationship that points to associated records in the many table. The user can specify the multiplicity and perform runtime checking to ensure that the constraints are followed.

For example:

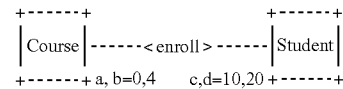

By way of illustration, consider a course registration system for a university with entities Course and Student. The relationships are: "courses have students enrolled" and "students enroll for courses". The questions answered by the multiplicity are "How many courses can a student take at one time?" and "How may students can be enrolled in a single course at one time?". In this example, someone is still considered a student if they have taken a semester off. If the multiplicity is changed to a,b=1,4 then every student would be required to take at least one course per semester. Thus, business rules, such as every student must take at least one course per semester, are captured.

Often, a set of entities may be associated in more than one way. Since it is a precise statement of an association between entities, each relationship must be clearly defined. The result can be more than one relationship between the same entities. One can represent these associations as separate columns. Consider a relationship between Person-Person. Two relationships can exist between the same two Person records. One relationship is Spouse, the other is Boss. These are represented as two separate columns for table Person.

Retrieval, insertion and update of records consisting of multiple associations can be performed faster using a single query. Transactions are simplified because updates, insertions and deletion of multiple one-way "1-many" relations are achieved by modifying a single row. Management of associations through queries becomes easier.

The present invention is a method which can be conveniently embodied in an article of maufacture or program storage device comprising a computer usable medium having computer readable code means embodied therein. The method of the present invention involves the following steps:

A.) Defining a database scheme;
B.) Quantify a relationship among a plurality of entities;
C.) Populate said database with instances of relationships among said entities and concurrently populating said databasewith Bitsets, inserts, deletes and/or changes;
D.) Submitting an query for desired information so that said database performs evaluation of said query using said Bitsets;
E.) Database generates a resultant set;
F.) Resultant set returned to a requester.
G.) Repeat any or all steps as needed.

BRIEF DESCRIPTION OF THE DRAWINGS

FIG. 2 shows a model for relationship between Course and Class using the old and new method.

FIG. 4 shows an example of modelling Categories with BITSETs

FIG. 5 illustrates the Boolean Evaluation process using BITSETs.

DETAILED DESCRIPTION OF THE PREFERRED EMBODIMENT OF THE PRESENT INVENTION

Figure 1:
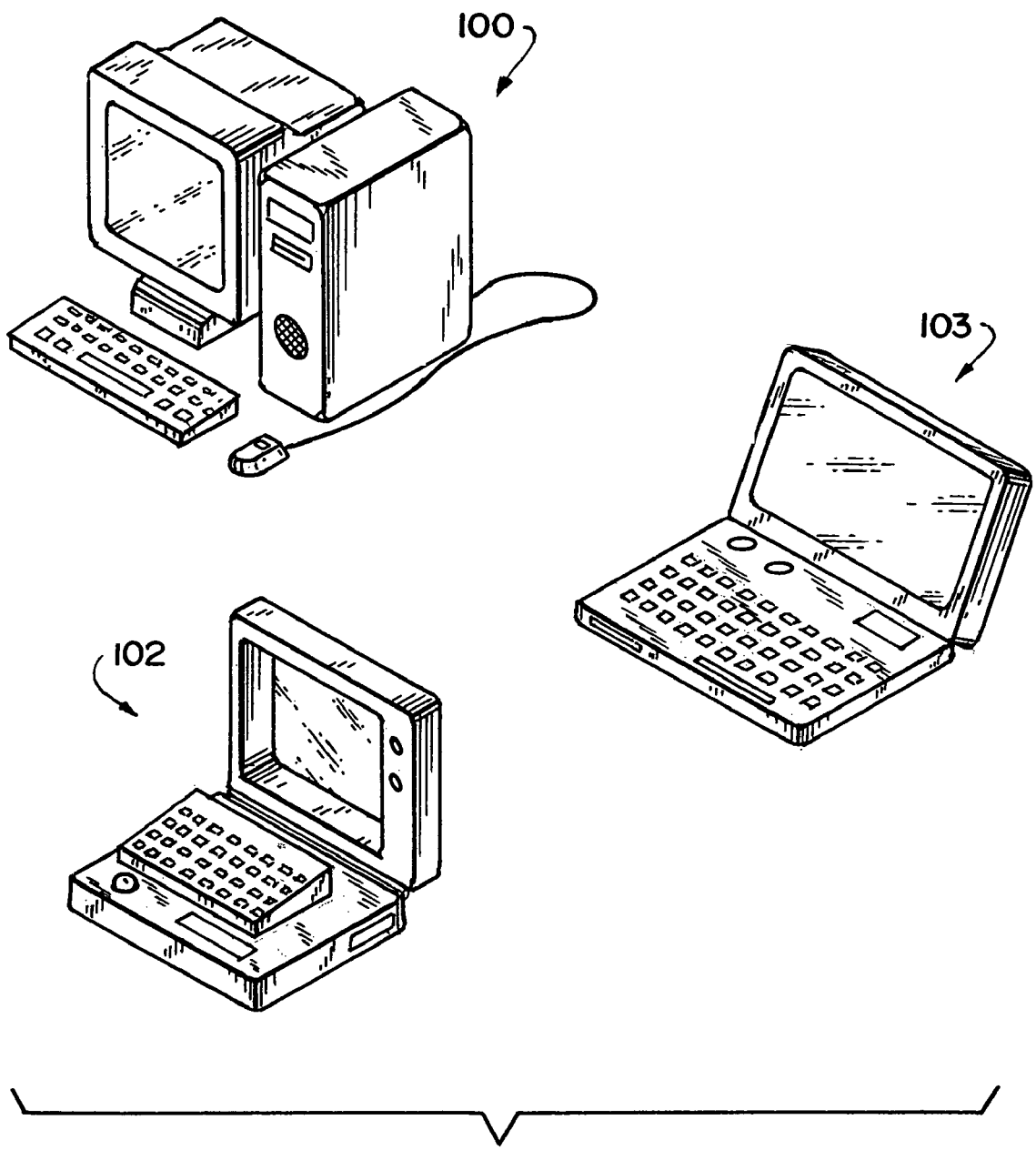
FIG. 1 shows the target platforms for the invention of the preferred embodiment.

The database systems of present invention relates uses BitSets to model and manage relationships between and/or among entities. The target platforms for the preferred embodiment of the present invention are depicted in FIG. 1. A customer can conveniently use the system of the present invention on any personal computer 100, laptop computer 104 or handheld computer 102. The computer has an operating system such as Windows 2000, Windows CE, Windows NT, or Linux.

The BITSET functions most commonly used in accordance with the present invention are explained below:

INTEGER BSGetLength(BITSET): Retrieves the current length of the BITSET. This function allows immediate retrieval of the number of associations without performing a join with the many table.

BSInit( ): Create a new BITSET without any lower or upper limits on the number of items in the BITSET. This function allows creation of associations from one to many table without specifying any limit to the number of associations.

BSInit(BIGINT,BIGINT): Create a new BITSET with lower and upper bounds on the number of items in the BITSET. This function allows creation of associations from one to many table with bounds on the number of associations in the many table.

BSSetBit(BITSET, BIGINT): Sets the specified bit in the BITSET. This functions allows creation of a new association to into the many table.

BSClearBit(BITSET, BIGINT): Clears the specified bit in the BITSET. This functions allows removal of the specified association from the one to the many table.

INTEGER BSGetBit(BIGINT): Checks for the specified bit in the BITSET, if present returns 1 otherwise 0. This functions allows checking for an existing association from the one to the many table.

BITSET BSAnd(BitSet, BitSet): Returns the logical AND of two BITSETs. This functions allows retrieval of associations that are common to two columns in the one table that point to the many table.

BSOr(BITSET, BITSET): Returns the logical OR of two BITSETs. This functions allows checking for associations that are present in either of the two columns in the one table that point to the many table.

BSEquals(BITSET, BITSET): Returns 1 if the two BITSETs are equal otherwise 0. This functions allows checking equality of all associations from both columns in the one table that point to the many table.

BITSET BSMinus(set1 BITSET, set2 BITSET): Returns a BITSET of bits in set1 that are not present in set2.

INTEGER BSAndEquals(set1 BITSET, set2 BITSET): Returns 1 if all bits from set2 are present in set1 otherwise 0.

INTEGER BSAndIsEmpty(BITSET, BITSET): Returns 1 if none of the bits from set2 are present in set1 otherwise 0.

BIGINT BSGetBitAt(BITSET, INTEGER): Retrieves the nth bit that is set in the BITSET.

BIGINT BSGetLowerBound(BITSET): Retrieves the lower bound for the BITSET.

BIGINT BSGetUpperBound(BITSET): Retrieves the upper bound for the BITSET.

BITSET BSCOR(BITSET . . . ): Column function that operates on a set of BITSETs to return an OR or the BITSETs BITSET BSCAND(BITSET . . . ): Column function that operates on a set of BITSETs to return an AND of the BITSETs TABLE(BIGINT) BSGetBits(BITSET): Table function that returns the bits in the BITSET ordered by value.

The Many-to-many relationship is normally represented as a table that contains two foreign keys concatenated in a non-atomic, compound key as its primary key. These are the unique, primary keys from the Relation table's two parents. Consider the following situation exemplified in FIG. 2-201:

---

Student(*SID, Sname, major)
Class(*CID, Cname, Time, room)

---

Student takes many classes and a class can have many students. In this case one cannot include the class id with student or the student id with class because multivalued attributes are not directly supported. These two entities and the relationship would create three relationships. Student_class(*SID,*CID), where the composite SID and CID form the key.

This scheme requires a Join between Student_class and Class to retrieve all classes that a particular student takes.

The system of the present invention is exemplified in FIG. 2-202, wherein an additional table is not needed to represent the relation. Instead the relation is represented as two 1-to-Many relations represented as BitSet columns to support multivalued attributes in each of the two parent tables.

---

Student(*SID,S.name,major,CIDBS)
Class(*CID, Cname, Time, room,SIDBS)

---

The following query permit the capability of retrieving all keys of classes that a student takes without a join: SELECT CIDBS from Student where SID=?

The following query allows retrieval of attributes from the class table without an explicit join:

---

SELECT CAST(ID AS REF(ClassType) SCOPE CLASS)->Cname from
TABLE(BSGetBits(CAST(? AS BITSET))) AS MYCLASS(ID)

---

Many times it is only necessary to confirm the existence of a particular quantity or non-existence of certain data in a table. In example presented herein, the user may be trying to determine whether a particular student has taken any classes at all. It is irrelevant if there is 1 class or 4 classes; what is desired in this instance is to confirm the existence of at least one or some fixed number. Using the prior art method, it is necessary to code: SELECT count(*) as classcount from Student_class where SID=? fetch first n rows only and the prior art program checks to see if classcount is greater than 0. However count(*) would cause read of all the qualifying rows index rows or an entire table scan if index was not present on SID for table Student_class. But why should it be necessary to count all qualifying rows to make sure that the user had the fixed number that was being sought.

The method of the present invention uses select BSGetLength(CIDBS) from Student where SID=?, thus only one specific row that contains the BitSet from Student table is accessed.

Use of Column function BSCAND for a particular column allows retrieval of a BitSet representing records that are only present in all the rows of the select query.

Consider the tables shown below. They show two many-to-many relationships Likes and Wears between Person and Color entities.

---

Person(*PersonID, PersonName, Age, ColorIDBSLikes, ColorIDBSWears)
Color(*ColorID, ColorName, PersonIDBSLikes, PersonIDBSWears)
SELECT BSCAND(ColorIDBSLikes) FROM Person WHERE Age between 13 and 19

---

The above query will retrieve the list of colors that some/any teenager likes.

Use of Column function BSCOR for a particular column allows retrieval of a BitSet representing records that are present in any of the rows of the select query.

SELECT BSCOR(ColorIDBSWears) FROM Person WHERE Age between 13 and 19

The above query will retrieve the list of colors that some teenager wears.

Use of scalar functions on BitSets allows fast querying without any joins. To find the list of Teenagers that wear at least one color that they like:

---

SELECT PersonName FROM Person WHERE BSAndIsNotEmpty(ColorIDBSLikes,ColorIDBSWears)=1 AND Age between 13 and 19

---

BitSets in Enterprise Java Beans

In the EJB Development Environment, an association is a relationship that exists between two CMP entity beans within an EJB group. There are three main types of association: one-to-one, one-to-many, and many-to-many. In a one-to-one (1:1) association, a CMP (Container Managed Persistence) entity bean is associated with a single instance of another CMP entity bean. For example, an Employee bean could be associated with only a single instance of an EmployeeID bean, because an employee can have only one employee identifier on file. In a one-to-many (1:M) association, a CMP entity bean is associated with multiple instances of another CMP entity bean.

For example, a Department bean could be associated with multiple instances of an Employee bean, because most departments are made up of multiple employees. In a many-to-many (M:M) association, multiple instances of a CMP entity bean are associated with multiple instances of another CMP entity bean. A many-to-many association is created by joining two 1:M associations. For example, multiple instances of a Customer bean could be associated with multiple instances of a Restaurant bean, because restaurants serve many customers, and customers patronize many different restaurants. In current implementations, when CMP fields and associations are eventually mapped to database tables, foreign keys are used to represent the associations in the database tables. Association roles are then added to the key of an enterprise bean, which makes the foreign key represented in the association part of the key class. The present invention takes advantage of BitSet for defining associations in EJBs. The present invention also takes advantage of Structured Data Types within the database to retrieve the attribute values of the associated table without an explicit join.

BitSets Used To Model Categories And Complex Entities Allows Fast Computation Of Applicability The following segment provides an example that utilizes inheritance relationships and the automatice generation of inheritance bits sets through forward and backward propagation. An author creates associations between a document and a set of categories. The associations allow inference of applicability between documents and product/categories through upward and downward propagation. This applicability of documents to multiple categories is represented by a Bucket Cache which is also expressed herein as "inheritance bit set relationship(s).

Figure 3:
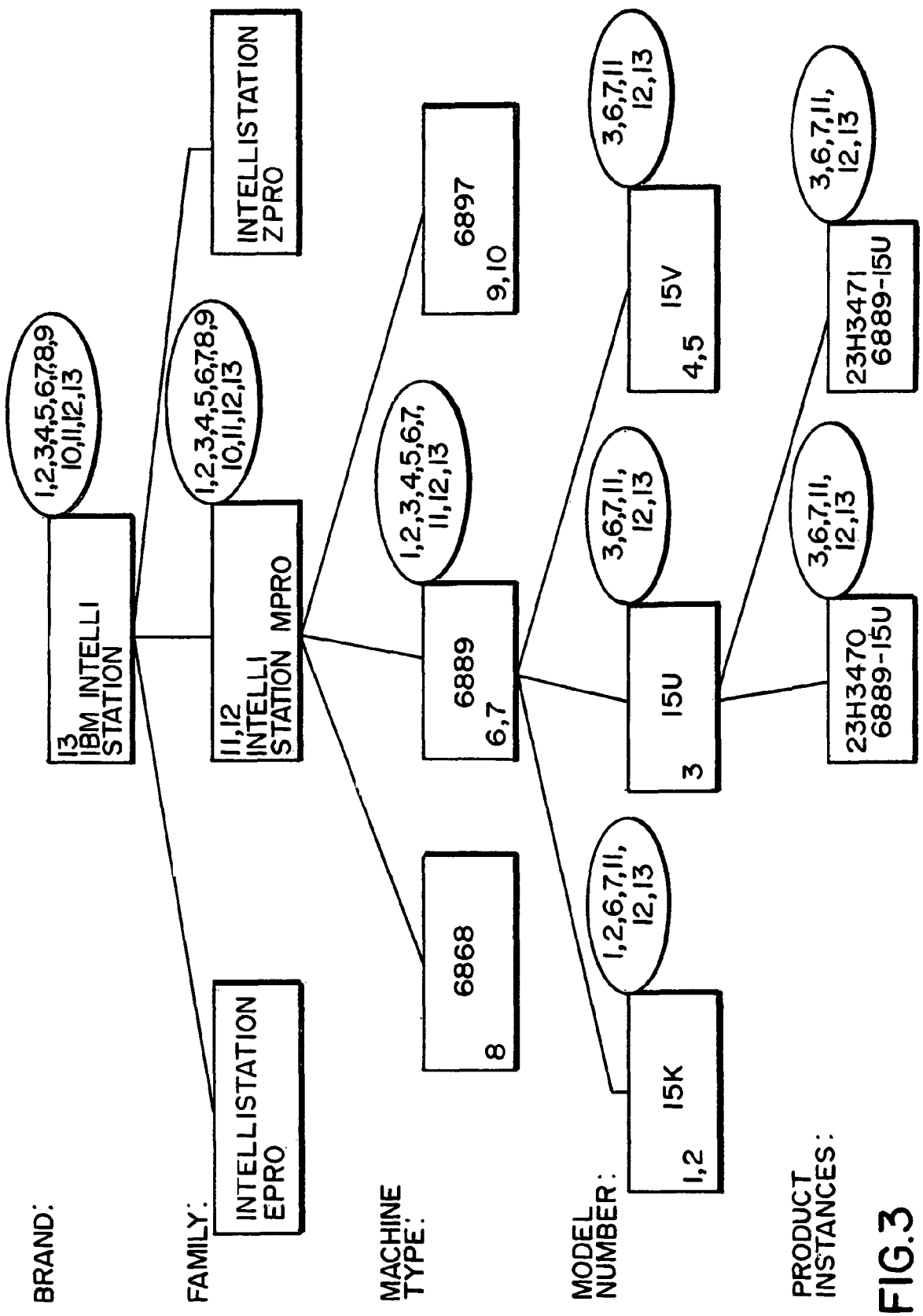
FIG. 3. An example of inference of product-category associations for documents.

FIG. 3 depicts an example of inference of applicability for product-category association to documents. The rectangular boxes shown in FIG. 3 represent different categories created by instantiating classes: i.e., Brand, Family, Machine Type, and Model Number. The Numbers from 1-13 represent documents in the Content catalog. Numbers inside the rectangular boxes represent an association authored between the document represented by the number and the category represented by a box. Numbers inside the ovals attached to the rectangular boxes represent the applicable documents, the Bucket Cache.

In the example depicted in FIG. 3, an association is authored between documents 6 and 7 to category Machine Type "6889". This means that documents 6 and 7 are applicable not only to category Machine Type "6889" but also to any of the ancestor categories of Machine Type "6889" and to any of the descendents (represented by the contains relationship) of Machine Type "6889". The ancestors of Machine Type "6889" are Family "IntelliStation MPro" and Brand "IBM IntelliStation." Therefore, the Bucket Caches of both these ancestors will contain the documents 6 and 7. Since Family "IntelliStation Zpro" and Family "Intellistation Epro" are not ancestors of Machine Type "6889", documents 6 and 7 are not propagated to them. Documents 6 and 7 are applicable to all the descendents of Machine Type "6889" which are Model Number "15K", "15U" and "15V" and all the associated instances of the products. In this example, only multiple descendents are shown. However, a category can have multiple ancestors (can be contained in multiple other categories). Therefore, the propagation will take place upwards through all ancestors.

A product, in turn, is a complex entity and is made up of other entities, for example, display adapters, hard drives, monitors, and processors. If a document is associated with a particular display adapter and that display adapter is a part of another product then the document is propagated upwards to all ancestors of the product containing the display adapter.

The above categorization is recognized prior art system usually modeled with the schema found in FIG. 4-401:

---

CATEGORY(CATEGORYID BIGINT)
DOCUMENT(DOCUMENTID BIGINT)
PARENTCHILDASSOCIATIONS(CHILDID BIGINT, PARENTID BIGINT)
CATEGORYDOCUMENTASSOCIATIONS(CATEGORYID BIGINT, DOCUMENTID BIGINT)

---

CATEGORYDOCUMENTASSOCIATIONS is the set of relations to documents for a CATEGORY. PARENTCHIL- DASSOCIATIONS table maintains the relations between a Category Child and its Parent(s). The query required to retrieve all documents that pertain to a particular category would be:

```
WITH
    tempcat (ID) as (select CATEGORYID from CATEGORY where CATEGORYID = ?),
-- May use more than one value with VALUES here:
    tempanc (ID) as -- Collect all ancestors
                (select assocfirst.PARENTID from PARENTCHILDASSOCIATIONS assocfirst
where assocfirst.CHILDID in (select ID from tempcat)
        union all
        select assoc.PARENTID from tempanc node, PARENTCHILDASSOCIATIONS assoc
where node.ID = assoc.CHILDID),
    tempdec (ID) as -- Collect all descendants
            (select assocfirst.CHILDID from PARENTCHILDASSOCIATIONS assocfirst where
assocfirst.PARENTID in (select ID from tempcat)
        union all
            select assoc.CHILDID from tempdec node, PARENTCHILDASSOCIATIONS assoc
where node.ID = assoc.PARENTID)
    select     distinct     assoc.DOCUMENTID     from
esupport.CATEGORYDOCUMENTASSOCIATIONS assoc where -- Retrieve implicit documents
            CATEGORYID in (select distinct ID from tempanc union select distinct ID from
tempdec union select ID from tempcat)
```

In accordance with the present invention, the improved schema is represented as depicted in FIG. 4-402:

```
CATEGORY(CATEGORYID BIGINT, BSDOCUMENT BITSET,
BSPARENT
BITSET, BSCHILD BITSET)
DOCUMENT(DOCUMENTID BIGINT)
```

BSDOCUMENT is the set of relations to the documents explicitly associated to a CATEGORY. BSCHILD is used to maintain relations between the node and its children. BSPARENT is used to maintain relations between the node and its parents. This novel approach allows easy traversal to the parents and children without a join with another table. It is also possible to maintain only one way associations with the use of only one of BSCHILD or BSPARENT column. The new query would look similar to:

Note that in the new query, select DISTINCT is no longer required because the BITSET OR function automatically maintains only one instance for the user. Also note that in the recursive query only one new row is computed in each iteration. Further note that an explicit join with the table CATEGORY may be eliminated by using DB2 Structured Types and "→".

BitSets Used To Model Boolean Expressions

The following is an example that utilizes boolean expression relationship(s) and the generation of boolean expression bit sets through forward (filtering) and backward propagation (evaluation).

A database consists of a table of boolean expressions. Each boolean expression can be thought of as having child BITSET and parent BITSET. The result of the combination of child BITSET, i.e. TRUE or FALSE is used to evaluate the parent associations. In addition to database consistency during authoring, fast rule evaluation is achieved by allowing the database to evaluate individual expressions. The table in FIG. 5 shows how the evaluation is performed. The first column specifies the BITSET of expressions that have been computed. The second column shows the function being executed

```
WITH
    tempcat (tempcategory) as VALUES(CAST(? AS BITSET)), -- Inital BITSET of categories
    tempanc (bsancestor) as -- Collect all ancestors
        (select BSCOR(bsparent) from table(BSGetBits(tempcategory)) as TEMP(ID),
CATEGORY WHERE ID=CATEGORY.CATEGORYID
        union all
        select BSCOR(bsparent) from table(BSGetBits(bsancestor)) AS TEMP(ID),
CATEGORY WHERE ID=CATEGORYID),
    tempdec (bsdescendent) as -- Collect all descendants
        (select BSCOR(bschild) from table(BSGetBits(tempcategory)) as TEMP(ID),
CATEGORY WHERE ID=CATEGORY.CATEGORYID
        union all
        select BSCOR(bschild) from table(BSGetBits(bsdescendent)) AS TEMP(ID),
CATEGORY WHERE ID=CATEGORYID)
    select     bscor(bsdocument)     from
table(BSGetBits(bsor(bscor(tempdec.bsdescendent),bscor(tempdec.bsancestor),bscor(cast(? as
BITSET)))
``` against the set of expressions in the database. The third column specifies the result of the expression. For complete rule evaluation, the following steps may be used:

Step 1: Start evaluation bottom up using the Enum Values BitSet that consists of known properties of an Entity. Default evaluation if value for an Entity's attribute is not provided is assumed to be false.

Step 2: Evaluate expressions with Enum Values. In this step, one insures that the Enum values will no longer be used in further computations. For example, AND Boolean Expression If any Enum Value child is FALSE, the Expression is FALSE For AND Boolean Expression, if all Enum Value children are TRUE, it means one only need look at the FALSE Expression children, the Enum values can be ignored in further steps.

This expression still needs to be evaluated but no longer depends on the Enum values.

Evaluate FALSE AND_BOOLEXPR: If even one Enum Value child is false→

```
AND_BOOLEXPR is FALSE
SELECT
ESUPPORT.BOOLEXPR.ENTITYID,CAST(ESUPPORT.BOOLEXPR.BSPARENT AS
BLOB(1M)) FROM ESUPPORT.BOOLEXPR WHERE
ESUPPORT.BOOLEXPR.OP=AND_BOOLEXPR AND
(ESUPPORT.BOOLEXPR.BSCHILDENUMVALUE IS NOT NULL) AND
ESUPPORT.BSANDEQUALS(CAST(? AS
ESUPPORT.BS),ESUPPORT.BOOLEXPR.BSCHILDENUMVALUE)=0 ORDER BY
ESUPPORT.BOOLEXPR.ENTITYID
```

OR Boolean Expression

If any Enum Value child is TRUE, the Expression is TRUE.

If all Enum Value children are FALSE, it means one only need look at the TRUE Expression children, the Enum values can be ignored in further steps. This expression still needs to be evaluated but no longer depends on the enum values.

Evaluate TRUE OR_BOOLEXPR: If even one Enum Value child is true→

```
OR_BOOLEXPR is TRUE
SELECT
ESUPPORT.BOOLEXPR.ENTITYID,CAST(ESUPPORT.BOOLEXPR.BSPARENT AS
BLOB(1M)) FROM ESUPPORT.BOOLEXPR WHERE
ESUPPORT.BOOLEXPR.OP=OR_BOOLEXPR AND
(ESUPPORT.BOOLEXPR.BSCHILDENUMVALUE IS NOT NULL) AND
ESUPPORT.BSANDISEMPTY(CAST(? AS
ESUPPORT.BS),ESUPPORT.BOOLEXPR.BSCHILDENUMVALUE)=0 ORDER BY
ESUPPORT.BOOLEXPR.ENTITYID
```

NAND Boolean Expression

If any Enum Value child is FALSE, the Expression is TRUE

If all Enum Value children are TRUE, it means one only need look at the FALSE Expression children, the Enum values can be ignored in further steps. This expression still needs to be evaluated but no longer depends on the enum values.

Evaluate TRUE NAND_BOOLEXPR: If even one Enum Value child is false→

```
NAND_BOOLEXPR is TRUE
SELECT
ESUPPORT.BOOLEXPR.ENTITYID,CAST(ESUPPORT.BOOLEXPR.BSPARENT AS
BLOB(1M)) FROM ESUPPORT.BOOLEXPR WHERE
ESUPPORT.BOOLEXPR.OP=NAND_BOOLEXPR AND
(ESUPPORT.BOOLEXPR.BSCHILDENUMVALUE IS NOT NULL) AND
ESUPPORT.BSANDEQUALS(CAST(? AS
ESUPPORT.BS),ESUPPORT.BOOLEXPR.BSCHILDENUMVALUE)=0 ORDER BY
ESUPPORT.BOOLEXPR.ENTITYID
```

NOR Boolean Expression

If any Enum Value child is TRUE, the Expression is FALSE.

If all Enum Value children are FALSE, it means one only need look at the TRUE Expression children, the enum values can be ignored in further steps. This expression still needs to be evaluated but no longer depends on the Enum values.

Evaluate FALSE NOR_BOOLEXPR: If even one Enum Value child is true→

---

NOR_BOOLEXPR is FALSE
SELECT
ESUPPORT.BOOLEXPR.ENTITYID,CAST(ESUPPORT.BOOLEXPR.BSPARENT AS
BLOB(1M)) FROM ESUPPORT.BOOLEXPR WHERE
ESUPPORT.BOOLEXPR.OP=NOR_BOOLEXPR AND
(ESUPPORT.BOOLEXPR.BSCHILDENUMVALUE IS NOT NULL) AND
ESUPPORT.BSANDISEMPTY(CAST(? AS
ESUPPORT.BS),ESUPPORT.BOOLEXPR.BSCHILDENUMVALUE)=0 ORDER BY
ESUPPORT.BOOLEXPR.ENTITYID

---

Step 3 Iterate or use Recursive Query until no new expressions are evaluated changed=evaluateBooleanExpression (bsParents,FALSE_expressionBitSet, TRUE_expressionBitSet,OPTIONAL_expressionBitSet);

The evaluateBooleanExpression consists of the following queries:

Evaluate the False Boolean Expressions

---

SELECT TT.ID RULEID, CAST(ESUPPORT.BOOLEXPR.BSPARENT
AS BLOB(1M))
RULEBSPARENT from TABLE(ESUPPORT.BSGETBITS(CAST(?
AS ESUPPORT.BS)))
AS TT(ID), ESUPPORT.BOOLEXPR WHERE
(TT.ID=ESUPPORT.BOOLEXPR.ENTITYID)AND
((ESUPPORT.BOOLEXPR.OP=AND_BOOLEXPR AND
ESUPPORT.BSANDISEMPTY(CAST(? AS
ESUPPORT.BS),ESUPPORT.BOOLEXPR.bsChildExpr)=0) OR
(ESUPPORT.BOOLEXPR.OP=NOR_BOOLEXPR AND
ESUPPORT.BSANDISEMPTY(CAST(? AS
ESUPPORT.BS),ESUPPORT.BOOLEXPR.BSCHILDEXPR)=0) OR
(ESUPPORT.BOOLEXPR.OP=OR_BOOLEXPR AND
ESUPPORT.BSANDEQUALS(CAST(? AS
ESUPPORT.BS),ESUPPORT.BOOLEXPR.BSCHILDEXPR)=1)OR
(ESUPPORT.BOOLEXPR.OP=NAND_BOOLEXPR AND
ESUPPORT.BSANDEQUALS(CAST(? AS
ESUPPORT.BS),ESUPPORT.BOOLEXPR.BSCHILDEXPR)=1))
ORDER BY TT.ID
Parameters:
1. ObjectTempParents
2. ObjectFALSEExpressions // AND
3. ObjectTRUEExpressions // NOR
4. ObjectFALSEExpressionsWithOptional // OR
5. ObjectTRUEExpressionsWithOptional // NAND Evaluate the True Boolean Expressions

---

SELECT TT.ID, CAST(ESUPPORT.BOOLEXPR.BSPARENT AS
BLOB(1M)) from
TABLE(ESUPPORT.BSGETBITS(CAST(? AS ESUPPORT.BS)))
AS TT(ID),
ESUPPORT.BOOLEXPR WHERE
(TT.ID=ESUPPORT.BOOLEXPR.ENTITYID) AND
((ESUPPORT.BOOLEXPR.OP=AND_BOOLEXPR AND
ESUPPORT.BSANDEQUALS(CAST(? AS
ESUPPORT.BS),ESUPPORT.BOOLEXPR.BSCHILDEXPR)=1) OR
(ESUPPORT.BOOLEXPR.OP=NOR_BOOLEXPR AND
ESUPPORT.BSANDEQUALS(CAST(? AS
ESUPPORT.BS),ESUPPORT.BOOLEXPR.BSCHILDEXPR)=1) OR
(ESUPPORT.BOOLEXPR.OP=OR_BOOLEXPR AND
ESUPPORT.BSANDISEMPTY(CAST(? AS
ESUPPORT.BS),ESUPPORT.BOOLEXPR.BSCHILDEXPR)=0) OR
(ESUPPORT.BOOLEXPR.OP=NAND_BOOLEXPR AND
ESUPPORT.BSANDISEMPTY(CAST(? AS -continued ESUPPORT.BS),ESUPPORT.BOOLEXPR.BSCHILDEXPR)=0))
ORDER BY TT.ID
Parameters:
1. ObjectTempParents
2. ObjectTRUEExpressionsWithOptional // AND
3. ObjectFALSEExpressionsWithOptional //NOR
4. ObjectTRUEExpressions //OR
5. ObjectFALSEExpressions //NAND Bitsets Used To Model Relations Between Husband And Wife In Different Societies The following example demonstrates the flexibility of the method of the present invention in representing different types of relationships and at the ease with which a model can be changed at runtime when relationships change. Depending on the society, the correct BSInit( . . . , . . . ) shown below can be used. The schema is modeled as:

---

MAN(ID,BSWIFE)
WOMAN(ID,BSHUSBAND)

---

Polygymous Society: A man may have several wives but a woman only one husband.

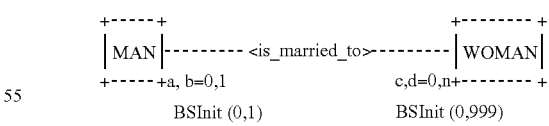

```
+-----+                          +--------+
| MAN |--------<is_married_to>---| WOMAN  |
+-----+a, b=0,1                  c,d=0,n+--------+
      BSInit (0,1)                BSInit (0,999)
```

The participation numbers reflect the following enterprise rules:

Not every woman marries a man (a=0).

Women marry at most one man (b=1).

Not every man need be married to a woman (c=0).

Some men may be married to more than one woman (d=n).

Polygamous Society: A woman (man) may have several husbands (wives).

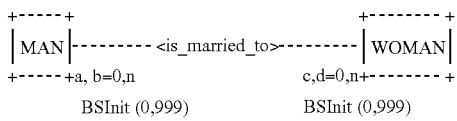

BSInit (0,999)   BSInit (0,999)

The participation numbers reflect the following enterprise rules:
Not every woman marries a man (a=0).
Some women may marry more than one man (b=n).
Not every man need be married to a woman (c=0).
Some men may be married to more than one woman (d=n).
Monogamous Society: A woman (man) may have at most one husband (wife).

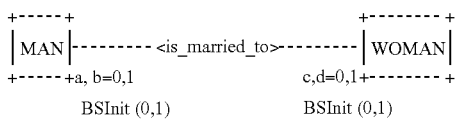

BSInit (0,1)   BSInit (0,1)

The participation numbers reflect the following enterprise rules:
Not every woman marries a man (a=0).
A woman marries at most one man (b=1).
Not every man need be married to a woman (c=0).
A man is married to at most one woman (d=1).
Muslem Society: A man may have up to 4 wives but a woman only one husband.

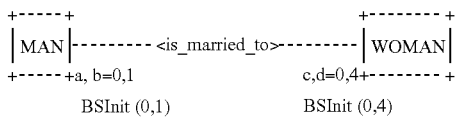

BSInit (0,1)   BSInit (0,4)

Not every woman marries a man (a=0).
A woman marries at most one man (b=1).
Not every man need be married to a woman (c=0).
A man is married to at most four women (d=4).

In all the above examples, the minimum participation numbers are zero. The reason for that assertion is that men and women in general need not get married at all. If HUSBAND and WIFE had been chosen as the entity types which participated in the <is_married_to> relationship, then all the minimum participation numbers would have been 1. A person cannot play the role of HUSBAND (WIFE) unless there is at least one other person married to that man (woman).

Now that the invention has been described by the way of the preferred embodiment, various modifications and improvements will occur to those of skill in the art. New SQL queries that use BITSETs effectively will be allowed by the database thus simplifying queries. Thus, it should be understood that the preferred embodiment has been provided as an example and not as a limitation. The scope of the invention is defined by the appended claims.

What we claim and desire to protect by Letters Patent is:

1. An article of manufacture comprising computer usable medium having computer readable program code means embodied therein for causing a relationship to be implemented within a database using BitSets, said program code being stored in computer readable memory or storage device, the computer readable program means in said article of manufacture comprising computer readable program code means for causing a computer to effect:

A) defining a database scheme;
B.) quantify a relationship among a plurality of entities;
C.) populate said database with instances of independent relationships among said entities and concurrently populating said database with Bitsets, inserts, deletes and/or changes, there being constraints on the number of keys in the BitSet to allow database integrity thus disallowing incorrect relationship data from being entered into said database, there being associations stored in the form of said Bitsets free from dependency on attribute data values;
D.) submitting an explicit query for desired information so that said database performs evaluation of said query using said Bitsets, said Bitsets being of variable length and prepopulated based upon associations, said query processing being independent of data values, said query for desired information being queries for categorization involving retrieving entities associated with all levels, with a single query using column functions for relationships and Boolean Rule evaluation using a method selected from the group consisting of iteration of recursive queries, confirmation of existence of or count of entities in the relationship;
E.) database generates a resultant set;
F.) resultant set returned to a requestor;
G.) repeat steps as D through F until a recursive association under consideration for said resultant set is exhausted, said steps for causing a relationship to be implemented within said database using BitSets being free of indexing.

2. The article of manufacture as recited in claim 1, the computer readable program code means in said article of manufacture further comprising computer readable program code means for causing a computer to effect an independent query to said database and said data base transforms said query to a BitSet query.

3. The article of manufacture as recited in claim 1, the computer readable program code means in said article of manufacture further comprising computer readable program code means for causing a computer BitSet to effect the use of BitSets, said BitSets being selected from the group consisting of User Defined Type BitSets and fast User defined functions.

4. The article of manufacture as recited in claim 1, the computer readable program code means in said article of manufacture further comprising computer readable program code means for causing a computer to effect, when the relationship in said database comprises one or more levels of inheritance relationships, the aggregation of inheritance BitSets through forward and/or backward propagation.

5. The article of manufacture as recited in claim 1, the computer readable program code means in said article of manufacture further comprising computer readable program code means for causing a computer to effect, when the relationship in said database comprises one or more levels of boolean expression relationships, the generation of boolean expression BitSets through forward and/or backward propagation.

6. The article of code means in said article of means for causing a computer manufacture as recited in claim 3, the computer readable program manufacture further comprising computer readable program code to effect the use of fast User Defined Functions, said fast User Defined Functions being selected from the group consisting of scalar functions and column functions.

7. The article of manufacture as recited in claim 6 wherein said computer readable program code means in said article of manufacture further comprises computer readable program code means for causing a computer to effect the use of scalar functions.

8. The article of manufacture as recited in claim 7, the computer readable program code means in said article of manufacture further comprising computer readable program code means for causing a computer to effect the use of scalar functions, said scalar functions selected from the group consisting of BSGetLength(BITSET), BSInitO, BSInit(BIGINT, BIGINT), BSSetBit(BitSet, BIGINT), BSClearBit(BitSet, BIGINT), BSGetBit(BIGINT), BSAnd(BitSet, BitSet), BSOr(BitSet, BitSet), BSEquals(BitSet, BitSet), BSMinus (BitSet, BitSet), BSAndEquals(BitSet, BitSet), BSAndIsEmpty(BitSet, BitSet), BSGetBitAt(BitSet, BIGINT), BSGetUpperBound(BitSet), BSGetLowerBound(BitSet).

9. The article of manufacture as recited in claim 6, the computer readable program code means in said article of manufacture further comprising computer readable program code means for causing a computer to effect the use of column functions.

10. A program storage device readable by machine, tangibly embodying a program of instructions executable by the machine to perform method steps embodied therein for causing a relationship to be implemented within a database using BitSets, said method steps comprising:
  A.) defining a database scheme;
  B.) quantifying a relationship among a plurality of entities;
  C.) populating said database with instances of relationships among said entities and concurrently populating said database with BitSets, inserts, deletes and/or changes;
  there being constraints on the number of keys in the BitSet to allow database integrity thus disallowing incorrect relationship data from being entered into said database, there being associations stored in the form of said Bitsets free from dependency on attribute data values;
  D.) submitting a query for desired information so that said database performs evaluation of said query using said Bitsets, said Bitsets being of variable length and prepopulated based upon associations, said-query processing being independent of data values,
  said query for desired information being queries for categorization involving retrieving entities associated with all levels with a single query using column functions for relationships, and Boolean Rule evaluation using a method selected from the group consisting of iteration of recursive queries, confirmation of existence of or count of entities in the relationship;
  E.) database generates a resultant set;
  F.) resultant set returned to a requestor;
  G.) repeat any or all steps as needed D through F until a relationship under consideration for said resultant set is exhausted.

11. The program storage device readable by machine as recited in claim 10, said method steps further comprising causing said machine to effect an independent query to said database and said data base transforms said query to a BitSet query.

12. The program storage device readable by machine as recited in claim 10, said method steps further comprising causing said machine to effect the use of BitSets, said BitSets being User Defined Type BitSets and fast User defined functions.

13. The program storage device readable by machine as recited in claim 10, said method steps further comprising causing said machine to effect, if when the relationship in said database comprises one or more levels of inheritance relationships, the aggregation of inheritance BitSets through forward and/or backward propagation.

14. The program storage device readable by machine as recited in claim 10, said method steps further comprising causing said machine to effect, when the relationship in said database comprises one or more levels of boolean expression relationships, the generation of boolean expression BitSets through forward and/or backward propagation.

15. The program storage device readable by machine as recited in claim 12, said method steps further comprising causing said machine to effect the use of fast User Defined Functions, said fast User Defined Functions being selected from the group consisting of scalar functions and column functions.

16. The program storage device readable by machine as recited in claim 15, said method steps further comprising causing said machine to effect the use of scalar functions.

17. The program storage device readable by machine as recited in claim 16, said method steps further comprising causing said machine to effect the use of scalar functions, said scalar functions selected from the group consisting of BSGetLength(BITSET), BSInitO, BSInit(BIGINT,BIGINT), BSSetBit(BitSet, BIGINT), BSClearBit(BitSet, BIGINT), BSGetBit(BIGINT), BSAnd(BitSet, BitSet), BSOr(BitSet, BitSet), BSEquals(BitSet, BitSet), BSMinus(BitSet, BitSet), BSAndEquals(BitSet, BitSet), BSAndIsEmpty(BitSet, BitSet), BSGetBitAt(BitSet, BIGINT), BSGetUpperBound(BitSet), BSGetLowerBound(BitSet).

18. An article of manufacture comprising computer usable medium having computer readable program code means embodied therein for causing a relationship to be implemented within a database using BitSets, said BitSets being selected from the group consisting of User Defined Type BitSets and fast User defined functions, said fast User Defined Functions being selected from the group consisting of scalar functions and column functions; and when said computer readable program code means for causing a computer effects the use of scalar functions, said scalar functions are selected from the group consisting of BSGetLength(BITSET), BSInitO, BSInit(BIGINT,BIGINT), BSSetBit(BitSet, BIGINT), BSClearBit(BitSet, BIGINT), BSGetBit(BIGINT), BSAnd(BitSet, BitSet), BSOr(BitSet, BitSet), BSEquals(BitSet, BitSet), BSMinus(BitSet, BitSet), BSAndEquals(BitSet, BitSet), BSAndIsEmpty(BitSet, BitSet), BSGetBitAt(BitSet, BIGINT), BSGetUpperBound(BitSet), BSGetLowerBound(BitSet);
  said program code being stored in computer readable memory or storage device, the computer readable program means in said article of manufacture comprising computer readable program code means for causing a computer to effect:
  A) defining a database scheme;
  B.) quantify a relationship among a plurality of entities;
  C.) populate said database with instances of independent relationships among said entities and concurrently populating said database with Bitsets, inserts, deletes and/or changes, there being constraints on the number of keys in the BitSet to allow database integrity thus disallowing incorrect relationship data from being entered into said database, there being associations stored in the form of said Bitsets free from dependency on attribute data values;
  D.) submitting an explicit query for desired information so that said database performs evaluation of said query using said Bitsets, said Bitsets being of variable length and prepopulated based upon associations, said query processing being independent of data values, said query for desired information being queries for categorization involving retrieving entities associated with all levels, with a single query using column functions for relationships and Boolean Rule evaluation using a method selected from the group consisting of iteration of recursive queries, confirmation of existence of or count of entities in the relationship;

further when the relationship in said database comprises one or more levels of inheritance relationships, and/or one or more levels of boolean expression relationships, the aggregation of inheritance BitSets or Boolean expression BitSets operate through forward and/or backward propagation respectively E.) database generates a resultant set;

F.) resultant set returned to a requestor;

G.) repeat steps as D through F until a recursive association under consideration for said resultant set is exhausted, said steps for causing a relationship to be implemented within said database using BitSets being free of indexing.

19. The article of manufacture as recited in claim 18, the computer readable program code means in said article of manufacture further comprising computer readable program code means for causing a computer to effect the use of column functions.

* * * * *